Nov. 9, 1926. 1,606,305
C. W. LEGUILLON
INTERMITTENT FEEDING DEVICE FOR SHEET, STRIP, OR STRAND MATERIAL
Original Filed June 30, 1921 2 Sheets-Sheet 1
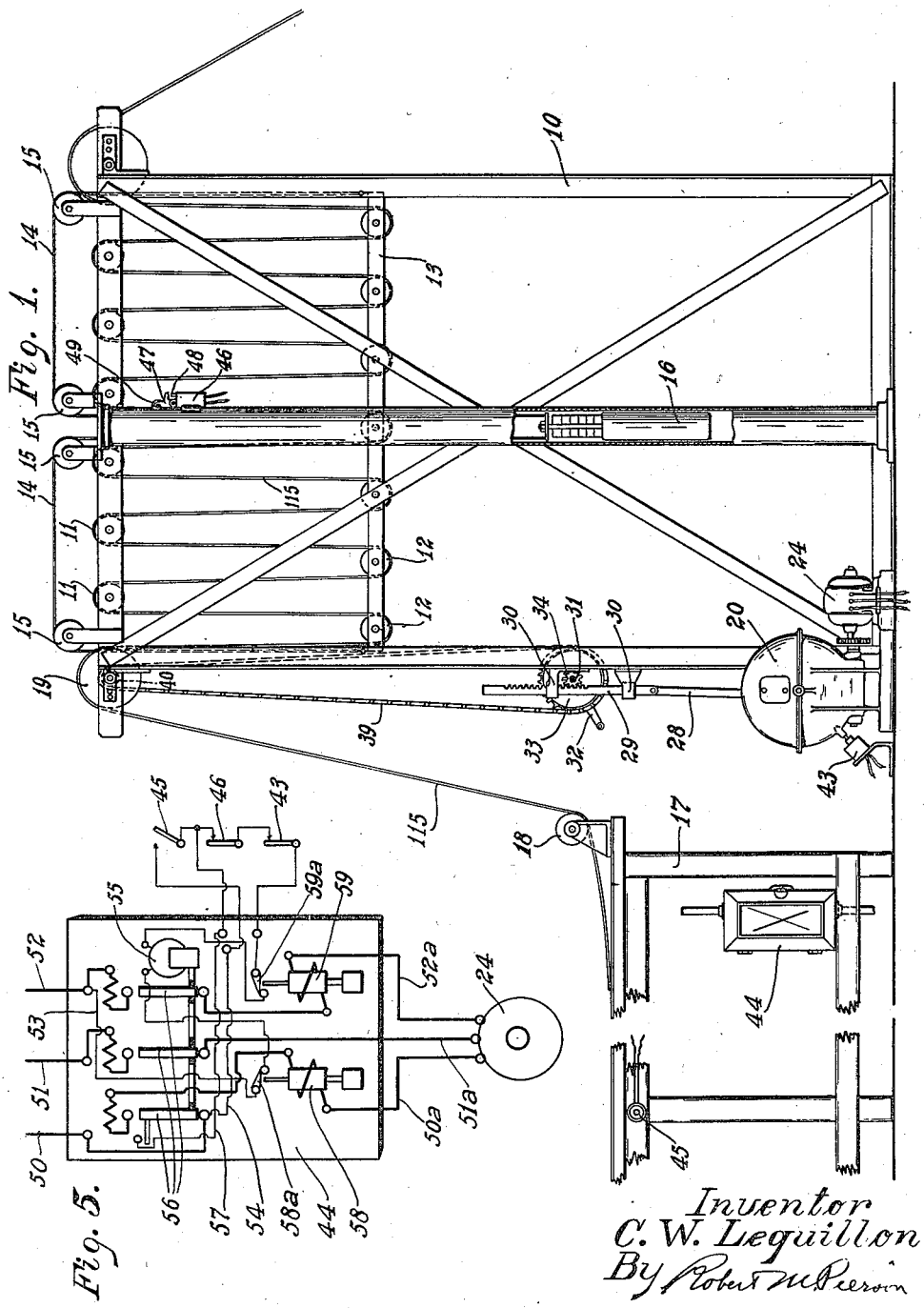
Inventor
C. W. Leguillon.
By Robert McPierson
Atty.

Nov. 9, 1926.
C. W. LEGUILLON
1,606,305
INTERMITTENT FEEDING DEVICE FOR SHEET, STRIP, OR STRAND MATERIAL
Original Filed June 30, 1921    2 Sheets-Sheet 2
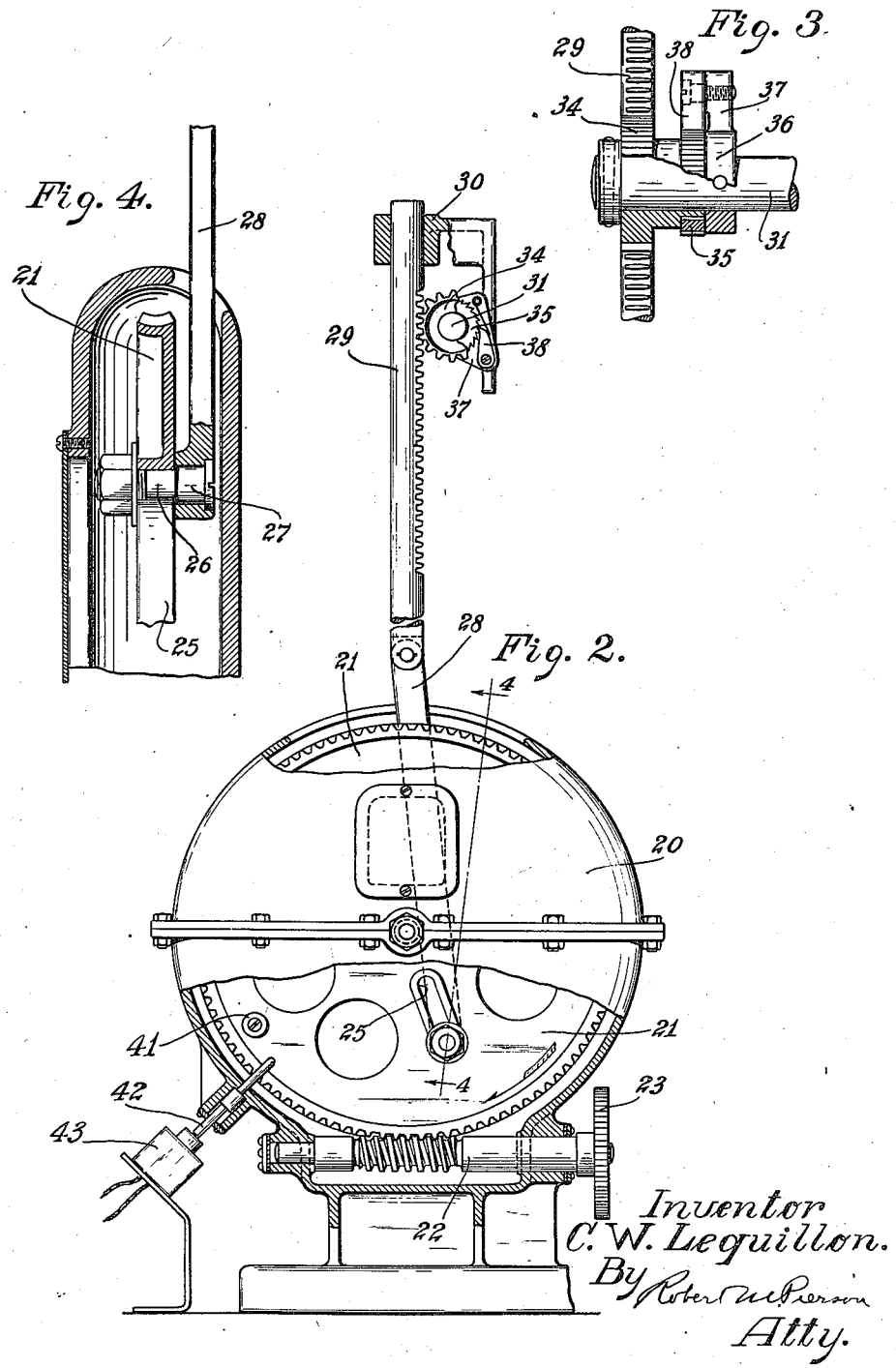
Inventor
C. W. Leguillon.
By Robert McPierson
Atty.

Patented Nov. 9, 1926.

1,606,305

UNITED STATES PATENT OFFICE.

CHARLES W. LEGUILLON, OF AKRON, OHIO, ASSIGNOR TO THE B. F. GOODRICH COMPANY, OF NEW YORK, N. Y., A CORPORATION OF NEW YORK.

INTERMITTENT FEEDING DEVICE FOR SHEET, STRIP, OR STRAND MATERIAL.

Application filed June 30, 1921, Serial No. 481,560. Renewed May 29, 1926.

This invention relates to means for feeding strip material in successive forward movements of predetermined and especially of equal lengths and is particularly adapted to be used in connection with means for maintaining a surplus of continuous strip material between an intermittent source of supply and a point of disposal. The accompanying drawings show, for example, an embodiment of my invention applied to a festooning rack in combination with a ply-up table, for supplying a tire-building machine (not shown). In common practice a continuous strip of tire-building material is formed by joining the ends of successive, relatively short strips, upon the ply-up table, said continuous strip thereafter being drawn onto a tire-core to form a pneumatic tire, and a festooning rack has been used as a means of taking up the slack between the ply-up table and the tire-building machine.

The ply-up table usually is provided with a linear scale or measuring means and as each "ply". representing the length of a tire circumference, is completed, the strip requires to be advanced, onto the festooning rack, substantially the length of a ply, to bring the end of the strip on the table into proper position for the splicing up and measuring of the next ply.

Sometimes the continuous strip consists of successive tire-units or lengths of rubberized fabric each suitable to constitute the several plies of one complete tire carcass, these successive tire-units being joined by relatively short lengths of rubberized fabric called "leaders", not destined to be incorporated in the tire, but serving to make the strip continuous and to draw the respective tire-units through the festooning rack and onto the tire-core. Such leaders may be of different length from that of a single ply of tire fabric, wherefore the continuous strip may require to be advanced a different distance to withdraw the leader from the table than to withdraw a ply of tire fabric therefrom.

The main object of my invention is to provide simple means for advancing a strip of material a predetermined distance and automatically stopping the advancing movement. while permitting it to be advanced by other means to position it relative to the first said advancing means. A further object is to provide means for automatically stopping the advance when the surplus of stock has reached a certain amount.

Of the accompanying drawings:

Fig. 1 is a side elevation, with parts broken away and parts in section, of a preferred embodiment of my invention applied to a ply-up table and festooning rack.

Fig. 2 is a similar view, on a larger scale, of a part of the device.

Fig. 3 is an elevation, with parts broken away and parts in section, of a rack and pinion mechanism.

Fig. 4 is a section on line 4—4 of Fig. 2.

Fig. 5 is a diagrammatic view of an electrical wiring system.

Referring to the drawings, 10 represents generally a festooning rack comprising an upper set of parallel rolls 11 journaled in fixed positions and a lower set of parallel rolls 12 journaled on a vertically slidable frame 13 connected by cables 14, passing from its four corners over pulleys 15, to a common weight 16, the two sets of rolls being adapted to hold a variable surplus of strip material 115 mounted thereon as shown in Fig. 1, the weight 16 serving to hold the frame 13 in horizontal position when the latter is raised by the withdrawal of stock from the rack or when it descends of its own weight when stock is fed into the rack. 17 is a ply-up table provided with a horizontal guide roll 18 at its end adjacent the festooning rack.

A feed roll 19 is journaled parallel to the series of rolls 11 in the top of the festooning rack, at the end thereof adjacent the ply-up table, and adapted to support the first festoon of stock and to feed the stock into the rack.

Mounted upon the floor approximately under one end of the roll 19 is a housing 20 (Fig. 2) having journaled therein a large worm gear 21 and a worm shaft 22 adapted to drive said worm gear, said worm shaft being provided with a gear 23 adapted to be driven by a motor 24 (Fig. 1) to turn the gear 21 clock-wise as viewed in Fig. 2. Said gear 21 is formed with a substantially radial slot 25 (Fig. 2) in which is adjustably mounted a clamping bolt 26 (Fig. 4) formed with an enlarged cylindrical portion 27 adjacent its head, providing a shoulder adapted to be clamped against the walls of the slot. Said enlarged portion 27 of the bolt 26 is thus adapted to serve as a crank pin for a pitman 28 extending upward through a circumferential slot in the top of the housing 20. 29 is a vertical rack slidably mounted in guide brackets 30, 30, secured to the frame of the festooning rack 10 and having its lower end hinged to the upper end of the pitman 28. 31 is a shaft journaled on the frame of the festooning rack parallel to and approximately under the roll 19, said shaft having secured thereon a hand crank 32 and a sprocket 33. 34 is a pinion loosely journaled on the shaft 31 and meshed with the rack 29, said pinion being formed on a common hub with a ratchet 35 (Figs. 2 and 3). 36 is a collar secured to the shaft 31 adjacent the ratchet 35 and formed with a radial plate 37 on which is pivoted a spring-pawl 38 associated with the ratchet 35. 39 is a sprocket chain connecting the sprocket 33 of the shaft 31 with a small sprocket 40 secured to the shaft of the feed-roll 19.

The gear 21 is provided with a stud roller 41 adapted at each revolution of said gear to actuate a push rod 42 slidably mounted in the wall of the housing 20 momentarily to open a normally closed electric switch 43.

44 is a switch box enclosing parts of an electric system for driving and stopping the apparatus. Said system comprises a normally open switch 45 mounted upon the ply-up table 17 at the hand of the operator, the aforementioned normally closed switch 43 associated with the gear 21, and a normally closed switch 46 mounted upon the festooning rack and adapted to be opened and held open when and so long as the festooning rack is substantially full of stock, said switch being enclosed in a box upon which is mounted a bell crank lever 47 and a push rod 48 associated with one arm thereof, the other arm being provided with a roller 49 adapted to be engaged by the weight 16 to open said switch.

Referring to the diagram shown in Fig. 5, 50, 51, 52 are the incoming lines of an alternating three-phase circuit and $50^a$, $51^a$, $52^a$, are the corresponding motor terminals. Wires 53, 54 branch from the wires 52 and 50 respectively and connect therewith in series the normally closed switches 43, 46, the normally open switch 45 and a solenoid 55. 56 is a three-pole contactor switch adapted to be closed by the solenoid 55 to connect the incoming lines 50, 51, 52 with the motor terminals $50^a$, $51^a$, $52^a$. 57 is a wire adapted when the switch 56 is closed to complete a shunt circuit between the wires 50 and 52, with the normally closed switches 43 and 46 and the solenoid 55 in said shunt circuit, cutting out the normally open switch 45. 58, 59 are overload relays in the motor lines $50^a$, $52^a$, adapted to open control circuit switches $58^a$, $59^a$ in the shunt circuit in case of overload on the motor.

It will be seen that this system is so arranged that the momentary closing of switch 45 energizes the solenoid 55, closing the switch 56, and that said solenoid then continues to be energized by the shunt circuit through wire 57, until switch 43 or switch 46 is opened, whereupon the solenoid 55 releases the switch 56, which falls open and remains open until switch 45 is again closed, although switches 43 or 46 be opened only momentarily.

In the operation of the device, the operator splices together successive lengths of tire fabric upon the ply-up table 17, forming the continuous strip 115 which is passed under the guide roll 18, over the feed-roll 19, and alternately under a lower roll 12 and over an upper roll 11 of the festooning rack 10. Said strip being thus threaded through the festooning rack to the tire building machine (not shown), the hand crank 32 is turned, clockwise, as viewed in Fig. 1, driving the shaft 31 (the pawl 38 running free on the ratchet 35), and the feed-roll 19, thus advancing the strip into the festooning rack until the end of a ply is at a chosen measuring point upon the ply-up table 17, the frame 13 descending by gravity and lifting the weight 16.

The next ply is then made up by splicing together additional lengths of fabric, and when it is completed the operator momentarily closes the normally open switch 45, which starts the motor 24, driving the gear 21, raising the pitman 28 and the rack 29 to drive the pinion 34 and with said pinion (the pawl 38 engaging the ratchet 35) the sprocket 33 and feed-roll 19, advancing the strip into the festooning rack 10, approximately the length of a ply or tire circumference, during the up stroke of the pitman 28, thus bringing the last end of the last formed ply to the chosen measuring point on the ply-up table.

During the succeeding downward stroke of the pitman 28 the pawl 38 runs free on the ratchet 35 and when such stroke is approximately completed, the gear 21 having made one revolution, the stud roller 41 strikes the push rod 42, momentarily opening the normally closed switch 43, breaking the current through the solenoid 55, allowing the switch 56 to fall open, and thus stopping the motor, which then remains stopped until the operator again closes the switch 45, as will be seen by reference to the wiring diagram of Fig. 5. An advantage in stopping the rack during its return stroke is that the slight further rotation of the gear 21 due to its momentum, after the switch 43 has been opened, does not result in corresponding rotation of the feed-roll 19. The stopping point of the latter is precisely determined by the rack 29 reaching the top of its stroke and not by the stopping point of the gear 21, which thus may vary somewhat according to its speed or condition of lubrication without affecting the stopping point of the work. The slot 25 and the clamping bolt 26 therein are adapted for very minute adjustments of the length of stroke of the pitman 28.

When a "leader" of different length than a ply is attached to the strip 115, the strip is advanced an appropriate distance by the hand crank 32, and the position of its end is thus properly adjusted on the ply-up table for the measurement of the succeeding ply, the gear 21 remaining stationary until put in motion by closing the switch 45 to again advance the strip the length of a ply. The length of stroke of the pitman 28 is adjusted to correspond to plies or tire circumferences of different lengths by varying the position of the clamping bolt 26 in the radial slot 25 of the gear 21.

When the festooning rack is substantially full of stock the motor 24 and consequently the feed-roll 19 is automatically stopped by the weight 16 striking the roller 49 and opening the normally closed switch 46, and when a part of the accumulated stock has been withdrawn from the festooning rack the strip may be adjusted relative to the gear 21 by turning the hand crank 32, to bring the end of the last ply on the table 17 into proper position for succeeding measuring and power-advancing operations.

Various modifications may be resorted to without departing from the scope of my invention, and I do not wholly limit my claims to the specific embodiment shown.

I claim:

1. The combination of a festooning rack and means for conveying material into said festooning rack in intermittent movements of predetermined length including a feed-roll, a reciprocating member adapted to drive said roll during the advance movement only of said member, and means for automatically stopping said member with the work in a predetermined position.

2. The combination of a festooning rack and means for conveying material into said festooning rack in intermittent movements of predetermined length including a feed-roll, a reciprocating member adapted to drive said roll during the advance movement only of said member, means for automatically stopping said member with the work in a predetermined position, and separate means for driving said roll.

3. In combination, a festooning rack, and means for conveying material into the festooning rack including an intermittently operating motor, a pitman actuated by said motor, mechanism driven by said pitman for advancing the work in one direction only of the movement of the pitman, and automatic means for cutting off the supply of energy to the motor during the inactive return movement of the pitman.

4. In combination, a festooning rack, means for conveying material into the festooning rack including an intermittently operating motor, a pitman actuated by said motor, mechanism driven by said pitman for advancing the work in one direction only of the movement of the pitman, and automatic means for cutting off the supply of energy to the motor at such point in the return movement of the pitman that the inertia of the motor, pitman and associated mechanism will have been gradually dissipated at or prior to the completion of the said return movement.

5. In combination with a festooning rack comprising a series of rollers journalled in fixed positions and a series of floating rollers adapted to be threaded by stock alternately with rollers of said fixed series, of a power actuated means for conveying stock into said festooning rack in intermittent movements of predetermined length.

6. In combination with a festooning rack comprising a series of rollers journaled in fixed positions and a series of floating rollers adapted to be threaded by stock alternately with rollers of said fixed series, of a power actuated means for conveying stock into said festooning rack in intermittent movements of predetermined length, including means for gradually accelerating the first period of each of said movements and gradually decelerating the last period of each of said movements.

7. In combination with a festooning rack comprising a series of rollers journaled in fixed positions and a series of floating rollers adapted to be threaded by the strip material alternately with rollers of said fixed series, of power actuated means for conveying the strip material into said festooning rack in intermittent movements of said predetermined length.

8. A mechanical feeding device for strip material comprising an intermittently operating motor, a pitman actuated by said motor, mechanism driven by said pitman for advancing the work in one direction only of the movement of the pitman and automatic means for cutting off the supply of energy to the motor during the inactive return movement of the pitman.

9. A mechanical feeding device for strip material comprising an intermittently operating motor, a pitman actuated by said motor, mechanism driven by said pitman for advancing the work in one direction only of the movement of the pitman and automatic means for cutting off the supply of energy to the motor at a point in the return movement of the pitman such that the inertia of the motor, pitman and associated mechanism will have been naturally and gradually dissipated at or prior to the completion of the said return movement.

10. A power actuated feeding device including a pitman adapted to advance work during the forward movement only of the pitman, a rotary member adapted to actuate said pitman, means for giving to said rotary member single and intermittent rotational movements including means for bringing gradually to a state of rest during the return movement of the pitman the rotary member and associated moving elements.

11. A power operated feeding device comprising a pitman adapted to advance the work during the forward movement only of said pitman, a rotary member adapted to actuate said pitman, and power actuating means therefor effecting the stopping of said rotary member during each return movement of said pitman.

In witness whereof I have hereunto set my hand this 24 day of June, 1921.

CHARLES W. LEGUILLON.